Patented Aug. 4, 1942

2,292,026

UNITED STATES PATENT OFFICE 2,292,026

METALLIC COATED CERAMIC WARE

Horace W. Gillett, Columbus, Ohio, assignor to Battelle Memorial Institute, Columbus, Ohio, a corporation of Ohio No Drawing. Application December 15, 1939, Serial No. 309,472

3 Claims. (Cl. 49—92)

This invention relates to the metallic coated ceramic ware. It has to do, particularly, with the coated glassware but it is also applicable to other coated ceramic articles, particularly where such articles have glazed surfaces. It relates especially to such articles coated with zirconium or titanium or both, though it is not necessarily limited thereto.

In the prior art, for example, in the decoration of glass and other ceramic ware, metallic bands or other designs are often desired. For example, platinum or gold compounds have been applied and reduced to metal during a firing operation. Present technique in the use of such metals requires expensive raw materials, hand labor and a firing operation. These may all be classed as drawbacks and the avoidance of any or all of such drawbacks is much to be desired.

In addition to the decorative uses mentioned above, the prior art presents other instances in which a more adherent and corrosion-resistant metal upon glass would be advantageous. For example, instead of the more or less common glass-to-glass ground joint, much improvement could be obtained if there could be interposed between the glass surfaces an adherent and corrosion-resistant metal to serve as a corrosion-resistant metal gasket therebetween.

One of the objects of this invention is to provide metallic coatings for glass and other ceramic articles which will be more adherent and more resistant to corrosion than previously known metallic coatings without necessitating the use of expensive raw materials, hand labor and firing operations.

Another object of this invention is to provide metallic coatings for glass or other ceramic articles which will not only be adherent and corrosion-resistant but which will also be of a decorative nature and of such a nature that other metallic coatings may be superimposed thereon or other metals welded or bonded thereto at a minimum cost.

Another object of this invention is to provide metallic coatings for glass or other ceramic articles which will be adherent and corrosion-resistant to such an extent that they can be utilized as an interposed seal between glass surfaces in order to serve as a gasket or similar intermediate layer which will be permanently attached to the glass.

It is known that in attempting to draw zirconium or titanium wire through a diamond die, seizure takes place and prevents satisfactory use of such a die. Obviously, this is a drawback in that particular field.

My invention involves the recognition that this characteristic of zirconium and titanium which is a drawback in such wire-drawing operations can be turned to good account in other fields such as the decorating of glassware, the production of intermediate gasket-like layers and, possibly, in other fields. I have discovered that the metals zirconium and titanium have the peculiar and unique property of adhering tightly to ordinary glass and glazed ceramic ware when the metal is properly rubbed against the glass surface. Moreover, such application of the metal results in the production on the glass or other ceramic ware of a bright, silver-like, metallic coating where such contact has been made. In effect, there is a seizure of the metals to the glass or other ceramic article which, in that particular case, is a phenomenon capable of useful application.

The metals zirconium and titanium, in massive ductile form are silver-bright and retain their metallic luster against tarnishing. Moreover, they are resistant to corrosion under many severe corrosive conditions, including the attack of a wide variety of acids and alkalies.

The adherent metal is not removed from the glass surface by scrubbing in soap and hot water, nor is it affected by the usual alkali materials used in dish-washing and like cleaning operations. For example, a plate decorated with zirconium and a saucer decorated with titanium have been filled with a 5 per cent sodium hydroxide solution and left for days without any change becoming observable. The coatings were not loosened. No tarnishing has been observable upon such zirconium or titanium bands, and the metals themselves remain bright after years of exposure to air without protection.

For the desired seizure of metal to glass to take place, it is desirable that the two be brought into contact under forcible pressure and relative motion. The metal may be dragged across the glass or the glass across the metal. For example, pencil-like rods of either zirconium or titanium may be held stationary and an article to be decorated with a band may be rotated against it. Or, the metal rod may be mounted for rotation, as in a drill press, the article to be coated then brought up against the revolving tip and moved over the path upon which the coating is desired. Coatings so applied are already bright, but may be buffed to still higher brilliance if desired. Bands of good appearance were obtained with the application of metal at the rate of about one gram per 5500 square centimeters of surface for titanium and 4500 for zirconium.

The glass or glazed surface may be lightly abraded prior to contact with the metal, to decrease the pressure needed in the application of the metal, without very greatly dulling the appearance of the metal coating. However, a very rough surface is not as satisfactorily coated, and the pretreatment of such surface might well consist of a smoothing rather than a roughening operation.

I have demonstrated the above facts by certain tests. The metallic zirconium and titanium used in these tests were the ductile metals produced by vapor phase deposition as described by J. D. Fast in the journal "Foote Prints," vol. 10, No. 2, December, 1937, pages 1–24. Either the unfabricated metals as deposited in the vapor process or those fabricated by swaging, rolling, drawing and other working processes may be used. Since the pure metals behave so much alike in their capacity for adherence to glass and since alloys of zirconium and titanium may be produced by using both together in the vapor phase deposition process, it is to be expected that such alloys would also have the ability to adhere to glass, and that, for such use where appearance and resistance to tarnish and corrosion are important and chemical composition in itself is not, the use of such alloys would cheapen the process because it would be unnecessary to go through the chemical separation of the two metals required to produce each one pure. Since such alloys are not commercially available, it has not yet been feasible to test them in the decoration process, but the indications point to their utility and economy.

As indicated above, there are other uses for glass with an adherent metal coating in addition to the decorative uses mentioned above. Thus, it is within the scope of my invention to utilize a zirconium coating or a titanium coating upon one or both glass surfaces to form an intermediate metallic layer instead of the usual glass-to-glass ground joint and I have reason to believe that such an intermediate layer will give an extremely corrosion-resistant metal gasket which will be permanently attached to the glass. The amount of preliminary grinding necessary to produce tight joints will, of course, depend on the perfection of the workmanship in the formation of the glass surfaces preliminary to such grinding. In some cases, no grinding will be necessary. Brilliance is not necessary in such applications.

I have made tests which show that the zirconium or titanium coatings upon glass or other ceramic articles can be used as a basis upon which other metal coatings that would not otherwise adhere to the glass can be deposited by appropriate methods. For instance, I have found that gold can be electrodeposited on the titanium or zirconium coating which has been applied to the article. Likewise, I have reason to believe that gold or other metals may be applied to the zirconium or titanium layer by welding as, for instance, by what is known as "proximity effect" welding.

As an example of a decorative coating superimposed upon zirconium or titanium coating on glass a gold coating can be deposited upon the freshly laid-on coating of zirconium or titanium by chemical replacement from suitable gold solutions. However, electrochemical deposition is under better control. In order to avoid the difficulty of making electrical contact to a previously laid-on zirconium or titanium coating, the application of the zirconium or titanium may be made beneath a suitable gold electroplating solution, with the zirconium or titanium "pencil" and the streak produced by it upon the glass, so connected electrically as to act as the cathode. Using this technique, gold bands have been laid down at the same time as the underlying zirconium or titanium is rubbed on to the glass, the gold deposit covering and obscuring the zirconium or titanium deposit. The plating bath, temperature and current density naturally must be controlled as in any plating process to secure the desired adherence and appearance of the gold coating.

In the case of certain light bulbs where it is desirable to seal a flat disk across the end of the glass tube, considerable difficulty has previously been encountered. I have reason to believe this difficulty could be removed by smearing either zirconium or titanium on the end of the glass tube and then welding the disk of stainless steel to the zirconium or titanium by a modified resistance welder using the "proximity effect" principle.

In the case of radio tubes, it is often necessary to seal a thin metal wire in a glass tube or attached to a glass surface. This can be accomplished by smearing the glass with zirconium or titanium and then welding the wire to the metal coating.

In the appended claims, it will be understood that the word "glass" is used to denote not only ordinary glasses but all glazed and reasonably smooth, or suitably smoothed ceramic materials which take the coating in a manner similar to glass. Wherever the word "smeared" or "smear" is used in any of the claims of this application it is intended to include regular as well as irregular markings and patterns or designs.

Having thus described my invention, what I claim is:

1. An article of manufacture comprising glass coated with at least one of the metals from the group of metals consisting of zirconium and titanium.

2. An article of manufacture comprising glass coated with zirconium.

3. An article of manufacture comprising glass coated with titanium.

HORACE W. GILLETT.